United States Patent
Senecal et al.

(10) Patent No.: US 12,316,672 B2
(45) Date of Patent: *May 27, 2025

(54) BOT DETECTION IN AN EDGE NETWORK USING TRANSPORT LAYER SECURITY (TLS) FINGERPRINT

(71) Applicant: Akamai Technologies, Inc., Cambridge, MA (US)

(72) Inventors: David Senecal, Santa Clara, CA (US); Andrew Kahn, San Francisco, CA (US); Ory Segal, Herzliya (IL); Elad Shuster, Herzliya (IL); Duc Nguyen, Santa Clara, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/383,351

(22) Filed: Oct. 24, 2023

(65) Prior Publication Data

US 2024/0056479 A1  Feb. 15, 2024

Related U.S. Application Data

(63) Continuation of application No. 17/533,185, filed on Nov. 23, 2021, now Pat. No. 11,799,908, which is a
(Continued)

(51) Int. Cl.
*H04L 29/06* (2006.01)
*G06N 20/00* (2019.01)
(Continued)

(52) U.S. Cl.
CPC .......... *H04L 63/1483* (2013.01); *G06N 20/00* (2019.01); *H04L 63/166* (2013.01); *H04L 67/02* (2013.01)

(58) Field of Classification Search
CPC ... H04L 63/1483; H04L 63/166; H04L 67/02; H04L 63/145; H04L 63/0281;
(Continued)

(56) References Cited

U.S. PATENT DOCUMENTS 9,906,544 B1 * 2/2018 Kurupati ............. H04L 63/1425
2014/0033317 A1 * 1/2014 Barber ............... G06Q 30/0609
709/224

(Continued)

OTHER PUBLICATIONS

Zhu et al., "Connection-Oriented DNS to Improve Privacy and Security", 2015 IEEE Symposium on Security and Privacy, Date of Conference: May 17-21 (Year: 2015).*

*Primary Examiner* — Morshed Mehedi
(74) *Attorney, Agent, or Firm* — David H. Judson

(57) ABSTRACT

This disclosure describes a technique to fingerprint TLS connection information to facilitate bot detection. The notion is referred to herein as "TLS fingerprinting." Preferably, TLS fingerprinting herein comprises combining different parameters from the initial "Hello" packet send by the client. In one embodiment, the different parameters from the Hello packet that are to create the fingerprint (the "TLS signature") are: record layer version, client version, ordered TLS extensions, ordered cipher list, ordered elliptic curve list, and ordered signature algorithms list. Preferably, the edge server persists the TLS signature for the duration of a session.

15 Claims, 4 Drawing Sheets

Related U.S. Application Data continuation of application No. 15/973,585, filed on May 8, 2018, now Pat. No. 11,184,390.

(60) Provisional application No. 62/599,845, filed on Dec. 18, 2017.

(51) Int. Cl.
*H04L 9/40* (2022.01)
*H04L 67/02* (2022.01)

(58) Field of Classification Search
CPC .......... H04L 2463/144; H04L 63/0272; G06N 20/00; G06N 3/08; G06N 7/005; G06N 20/10
See application file for complete search history.

(56) References Cited

U.S. PATENT DOCUMENTS

2016/0005029 A1* 1/2016 Ivey .................... G06Q 20/4016
705/44
2017/0288987 A1* 10/2017 Pasupathy ........... H04L 63/0227

* cited by examiner

BOT DETECTION IN AN EDGE NETWORK USING TRANSPORT LAYER SECURITY (TLS) FINGERPRINT

BACKGROUND

Technical Field

This application relates generally to protecting websites and mobile applications (apps) from automated attacks by scripts or bots using TLS connections.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

Transport Layer Security (TLS) and its predecessor, Secure Sockets Layer (SSL), are cryptographic protocols that provide Internet communication security. They use asymmetric cryptography for authentication and key exchange, symmetric encryption for confidentiality, and message authentication codes for message integrity. TLS/SSL is initialized at a session layer then works at a presentation layer. In particular, first the session layer has a handshake using an asymmetric cipher to establish cipher settings and a shared key for that session. Thereafter, a presentation layer encrypts the rest of the communication using a symmetric cipher and that session key. In both models, TLS and SSL work on behalf of the underlying transport layer, whose segments carry encrypted data. TLS is an IETF standards track protocol, defined in RFC 5246 and RFC 6176.

For a traditional RSA-based TLS session, the two sides of a connection agree upon a "pre-master secret" (PMS) which is used to generate the parameters for the remainder of the session. Typically, the two sides use RSA asymmetric encryption to establish the pre-master secret without exchanging the actual value in plaintext. In operation, the SSL client generates the pre-master secret and encrypts it with the TLS server's publicly available RSA key. This generates an encrypted pre-master secret (ePMS), which is then provided to the TLS server. The TLS server has a private decryption key, which is then used to decrypt the encrypted pre-master secret. At this point, both the client and the server have the original pre-master secret and can use it to generate the symmetric key used for actual encrypted and secure data exchange. Decrypting the encrypted pre-master secret is the only time in the TLS connection that the private key is needed. This decryption occurs at a so-called TLS termination point. Where a CDN is used to facilitate delivery of secure content, the TLS termination point will be located in the CDN.

All credential stuffing and other fraud attacks (gift card/loyalty point abuse, add-to-card, create new account, checkout) CDN customers are facing on a daily basis are done against an endpoint that requires a secure connection using SSL/TLS. Also, with the rise of HTTP/2, which is based on SSL/TLS, as well as customers starting to serve the entire content of their site securely, the amount of CDN-delivered secure traffic is increasing overall. By nature of SSL/TLS, no intermediate entity can nor should intervene or modify the data, except when users are behind a SSL proxy/accelerator that handles the outbound web request.

With the significant increase in TLS use, there is a significant need for enhancing bot detection techniques to detect scripts or bots that attempt to connect via TLS. The technique set forth herein addresses this need.

BRIEF SUMMARY

This disclosure describes a technique to fingerprint TLS connection information to facilitate bot detection. The notion is referred to herein as "TLS fingerprinting." Preferably, TLS fingerprinting herein comprises combining different parameters from the initial "Hello" packet send by the client. In one embodiment, the different parameters from the Hello packet that are to create the fingerprint (the "TLS signature") are: record layer version, client version, ordered TLS extensions, ordered cipher list, ordered elliptic curve list, and ordered signature algorithms list. Preferably, the edge server persists the TLS signature for the duration of a session.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
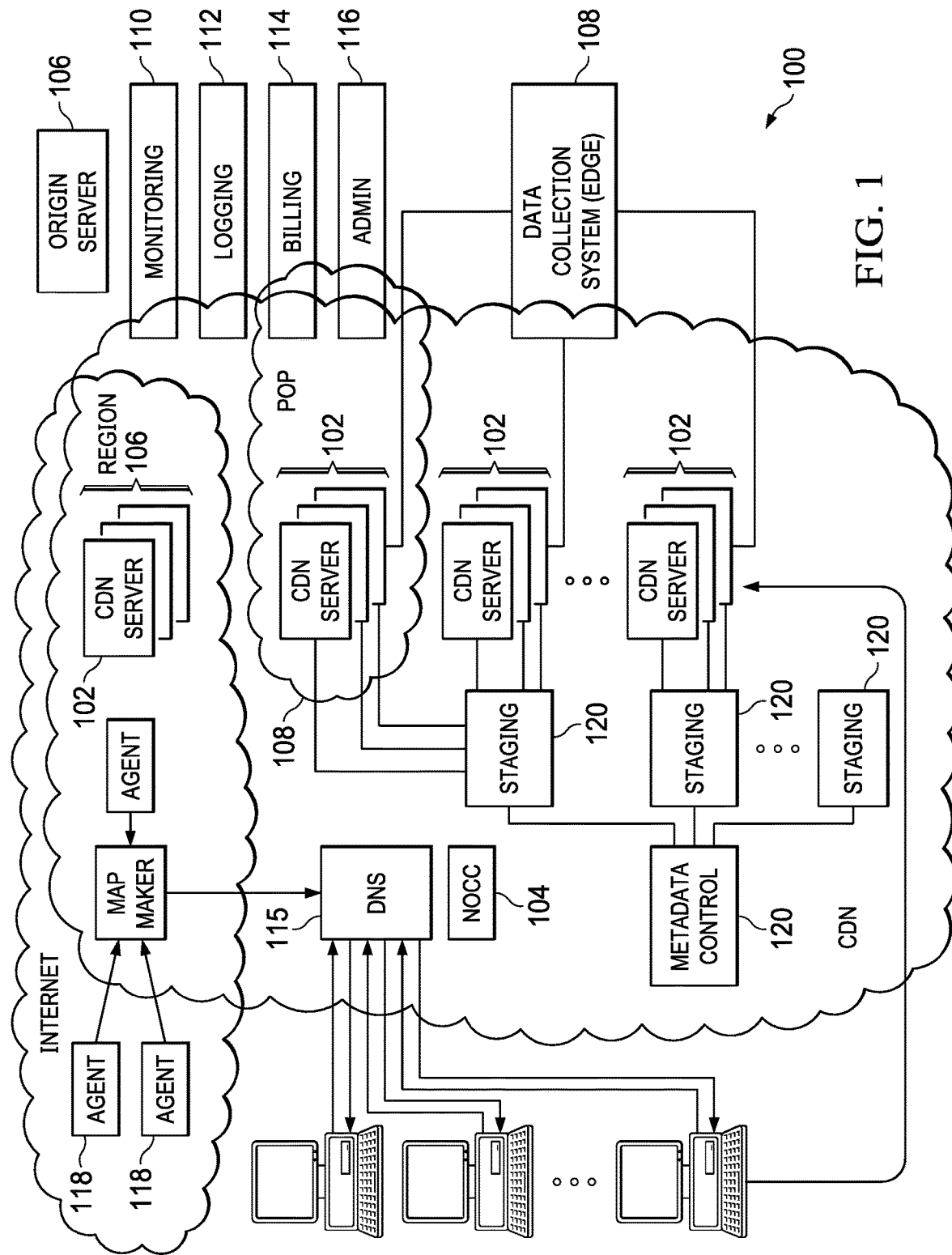
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or subdomains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
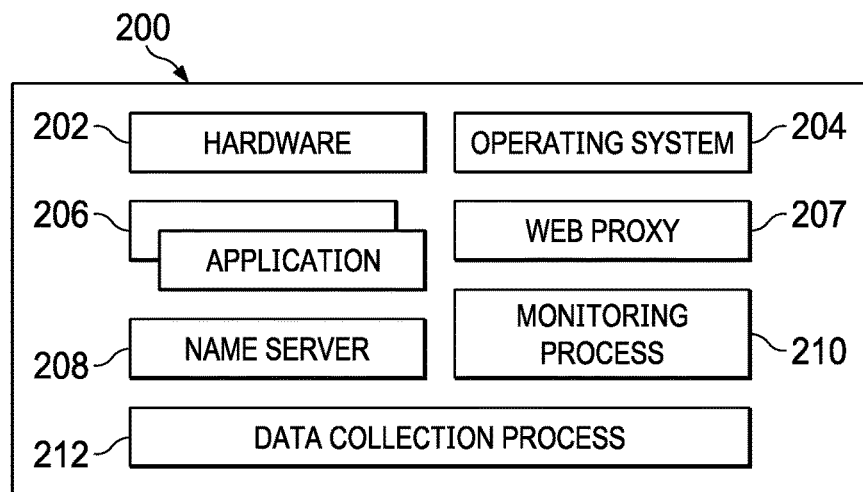
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" process), a name server 208, a local monitoring process 210, a distributed data collection process 212, and the like. For streaming media, the machine typically includes one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Thus, and as used herein, an "edge server" refers to a CDN (overlay network) edge machine. For a given customer, the CDN service provider may allow a TCP connection to originate from a client (e.g., an end user browser, or mobile app) and connect to an edge machine representing the customer on a virtual IP address (VIP) assigned to the customer, or a general VIP that allows for discovery of the intended customer. For purposes of this disclosure, it is assumed that this edge machine does not have the customer's private key or the customer's certificate.

Figure 3:
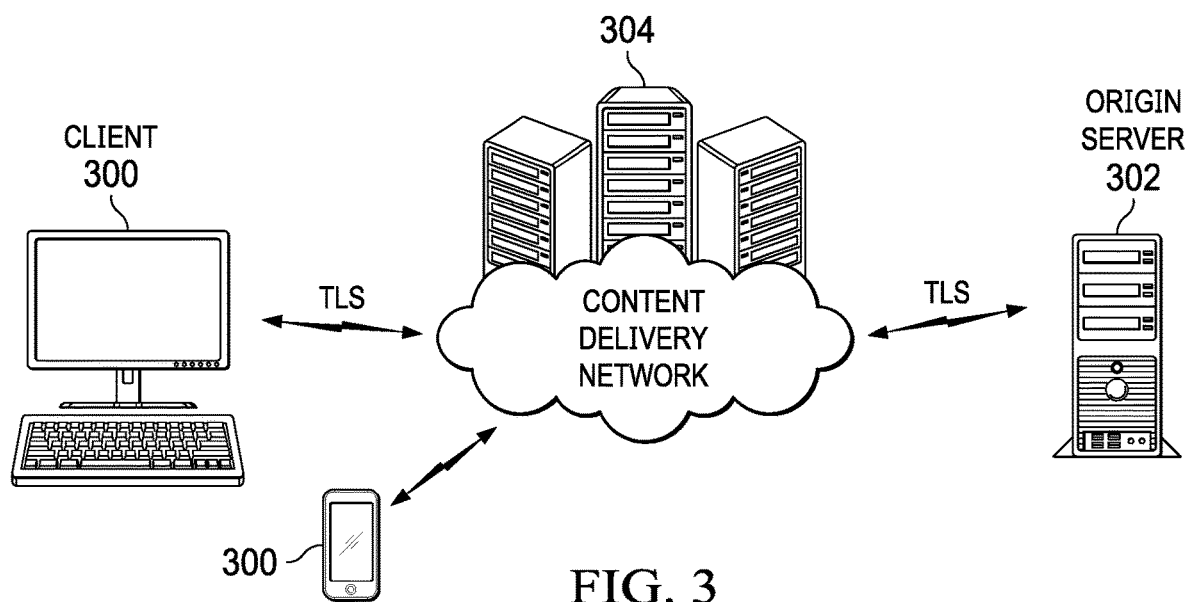
FIG. 3 is a representative active TLS session among a client, an edge server, and an origin server and into which the edge server, with permission, is enabled to shunt into without a certificate and/or private key according to this disclosure.

As illustrated in FIG. 3, in the typical interaction scenario, an end user client browser or mobile app 300 is associated with a customer origin server (or "origin") 302 via the intermediary of an overlay network edge machine server instance 304 (sometimes referred to as an "edge server"). The terms "origin" or "edge" are not intended to be limiting.

The following provides details regarding the TLS handshake between the client 300 and the origin 302. As noted above, the reader's familiarity with the TLS Specification is presumed. The edge machine server instance 304 passes handshake messages through directly to the origin 302, and vice versa. Once the handshake is complete, the origin 302 and client 300 will have negotiated a Pre-Master Secret and exchange random number values for the session. According to the TLS 1.2 Specification Section 8.1, each side will have converted its Pre-Master Secret into a Master Secret using an agreed-upon pseudo-random function (PRF), such as an HMAC variant. The TLS 1.2 Specification Section 6.3 notes that this Master Secret is then converted into a larger key block, which is then used to calculate the following TLS items: client_write_MAC_key (the key that be used as input to the client's sent data message authentication codes (MACs)), wherein each TLSCipherText record has a MAC that verifies the data in the record is authentic and unchanged); server_write_MAC_key (the key that will be used as input to the server's sent data MACs); client_write_key (the key that will be used for the agreed-upon bulk encryption cipher for client sent data; and server_write_key (the key that will be used for the agreed-upon bulk encryption cipher for server sent data). Other items may be calculated but, for purposes of this protocol, are not relevant.

As further background, HTTP requests are expected to come with certain headers, for example the Host header, which may indicate which web server is being addressed, or the User-agent, which identifies what type of system (browser, device) is making the request so that the web server hosting the content can response with content adapted to the system that requests it. Different browsers (Edge, Firefox, Safari, Chrome, Opera) send more or less the same set of headers, but the order in which headers are sent varies from one browser to the next or the HTTP protocol version. The header sent also depends on the method of the (POST vs. GET). and the type (XHR request vs. text/html requests). The order of the HTTP header and the protocol version constitutes the header fingerprint.

It is known to perform client request anomaly detection by evaluating a request header signature and looking for anomalies typically seen with bots. If the total anomaly score reaches a predefined threshold, an action rule will trigger. Some of these rules are designed to evaluate the header order of requests coming from client claiming to be Firefox, Chrome, Opera, Safari, Internet Explorer or Microsoft Edge.

Basic bots and botnets can be detected relatively easily using such detection techniques. These more simplistic bots usually give themselves away because there are enough anomalies in the header signature, or their behavior is atypical of a regular user. That said, the system may produce false negatives with respect to highly distributed botnets that "hide" behind a proxy, send request at a low rate, or perhaps have little to no anomalies in their header signatures. To detect these more sophisticated botnets, sometimes running on a headless browser (e.g., CasperJS, PhantomJS, Selenium, NodeJS), more advanced detection techniques may be used. JavaScript injection techniques are widely used in the industry to help detect these more advanced botnets. In particular, a bot that shows little anomalies in the header signature and behaves "like a regular user" may actually not fully support JavaScript. For a bot that fully supports JavaScript, it is desirable to inject code that helps collect specific characteristics (a fingerprint) of the client that when evaluated, helps detect them.

Bot detection using information collected through Javascript (JS) may proceed as follows. At step (1), the JS is dynamically injected at the edge on the relevant pages (text/html). At step (2), the client loads the JS, executes it, and sends the data collected asynchronously. At step (3), the edge server intercepts and evaluates the JS fingerprint, looking for specific anomalies typically seen when coming from an automated system (script or bot, etc.). At step (4), each anomaly is given a score and, if the fingerprint total anomaly score goes beyond a certain threshold, the client is classified as a bot. The result of the fingerprint evaluation is recorded in a session cookie and evaluated with each subsequent request.

TLS Fingerprinting

Figure 4:
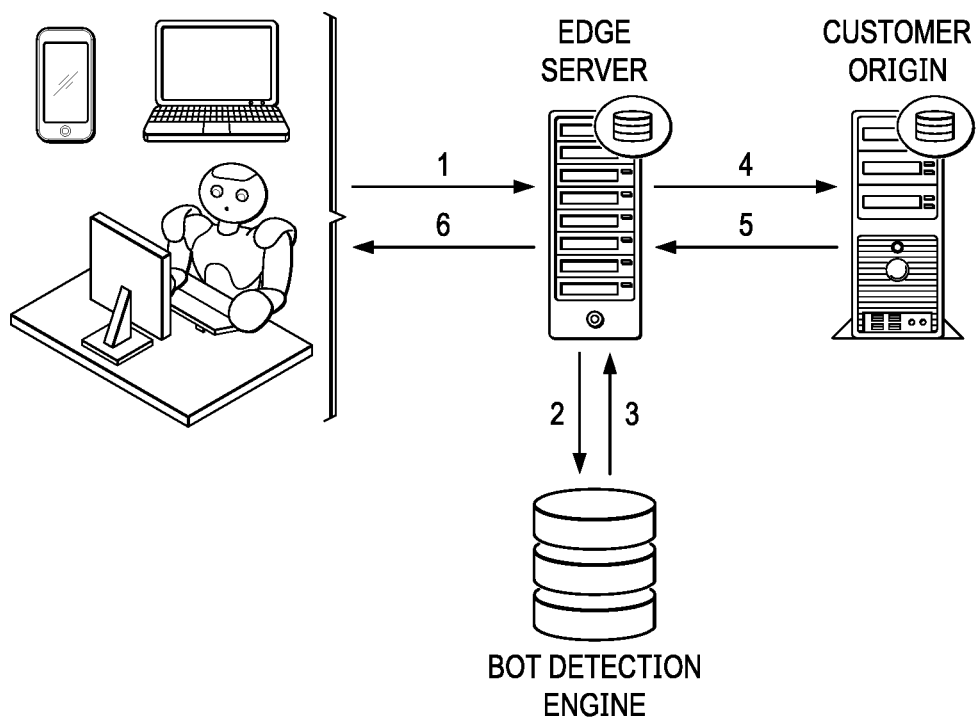
FIG. 4 is an embodiment of a TLS fingerprint detection scheme of this disclosure.

With the above as background, the basic workflow is depicted in FIG. 4. At step (1), the client (mobile device, laptop or bot) establishes a secure connection with the edge server. At step (2), the edge server extract the TLS parameters sent by the client and computes a hash. The TLS hash value is sent to a learning system along with other characteristics available in the request, such as: HTTP request header order, User-agent value, HTTP version, Client IP address, Referer, and perhaps others. At step (3), heuristics are run, preferably on a regular basis, against the information collected on the learning system to statistically establish which fingerprint is typical of a legitimate client/user. and which one is typical of an automated system. In one example embodiment, this method enables the system to identify automated system spoofing to a legitimate Chrome user-agent. The learning system responds to the edge with a score (e.g., 0=good, 1=bad). At step (4), if the score indicates that the client is not a legitimate (good) client, the edge server may be configured to take an action on the request (deny, tarpit, serve alternate content), or it may simply pass the request forward the customer origin server if the customer elects only to monitor the traffic. At step (5), the customer origin server processes the request and respond with the requested content. At step (6), the edge server passes the customer origin server response to the client.

The following describes several variants.

Figure 5:
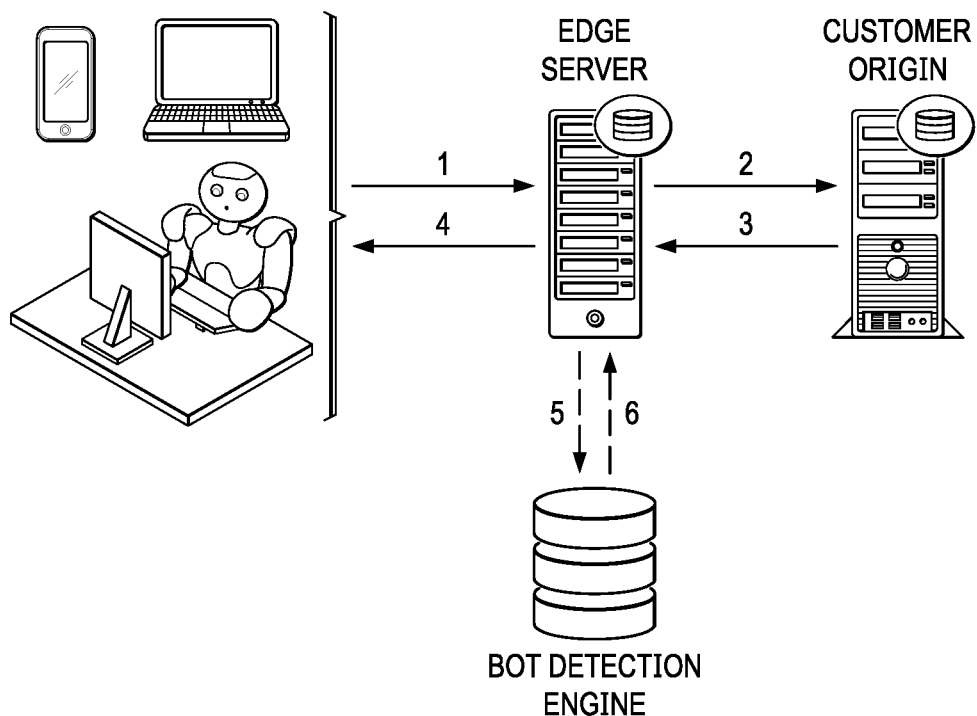
FIG. 5 is another embodiment of the TLS fingerprint detection scheme.

Thus, in one embodiment, the learning data from step (2) above may be delivered out-of-band (namely, outside of the request flow). Also, the learning system may publish to the edge a list of known bad signatures (e.g., a combination of TLS hash+header order+user-agent) so that the evaluation in step (3) does not require a call to an external database. FIG. 5 depicts a preferred implementation, which is now described.

At step (1), the client (mobile device, laptop or bot) establishes a secure connection with the CDN edge server. At step (2), the edge server computes the TLS hash and the header order hash, and extracts the user-agent, method, request type. At this point, the edge preferably checks all this information against a known bad signature directory. If the request signature is found in the bad signature directory, the edge server may be configured to take an action on the request (deny, tarpit, serve alternate content), or it may simply pass the request forward the customer origin server, e.g., if the customer chooses to only monitor the traffic. At step (3), the customer origin server processes the request and respond with the requested content. At step (4), the edge server passes the customer origin server response to the client. At step (5), the edge server passes the data collected to the learning system. At step (6), the learning system publishes to the edge a new list of bad signature(s), preferably periodically. In an alternative embodiment, the new list of bad signature(s) may be published to the edge continuously or asynchronously, in response to a given event or occurrence.

Figure 6:
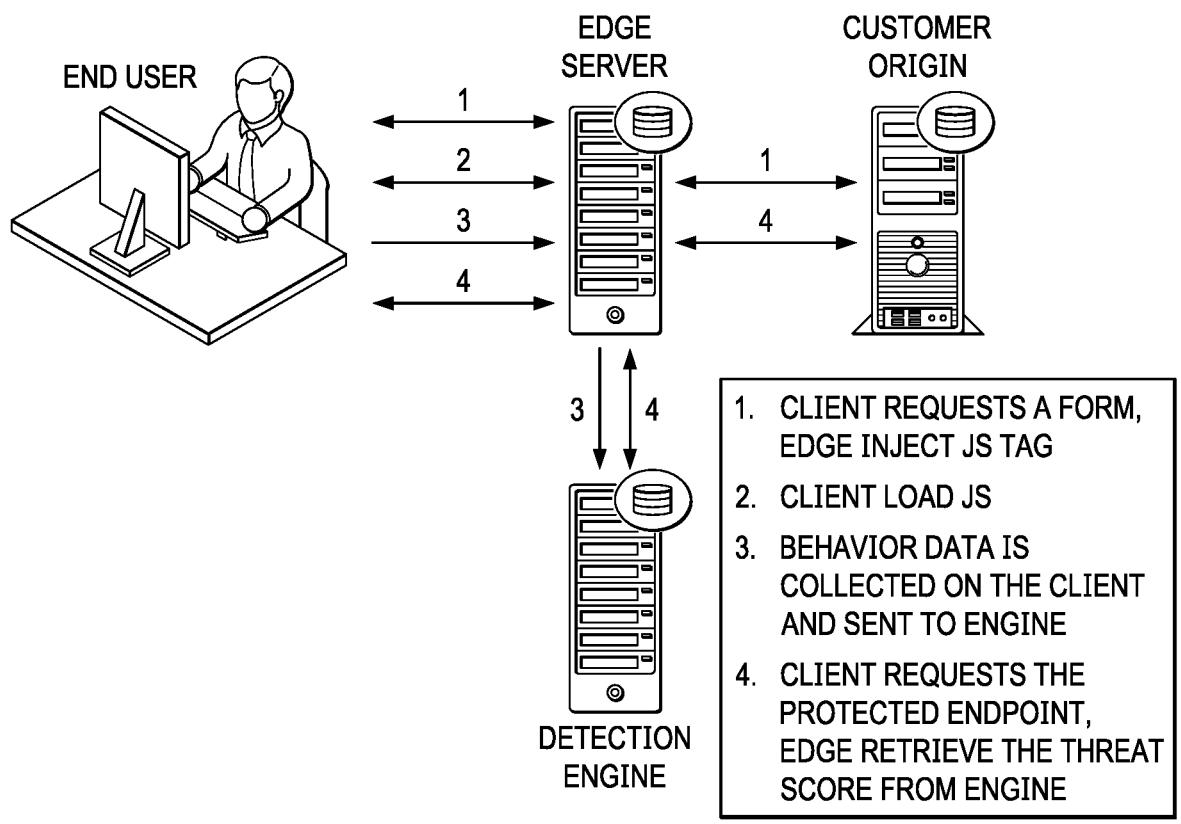
FIG. 6 is another depiction of the detection scheme.

Thus, and as depicted in FIG. 6, JavaScript-based technology collects a lightweight fingerprint and other behavioral data from the client. The data is collected asynchronously and sent to the bot detection engine. On a protected request (e.g. TLS-secured POST login), the edge server obtains the client classification from the bot detection engine and applies it on the edge.

Several methods may be used to detect bots using the TLS fingerprint include, without limitation, anomaly detection, dynamic rate limiting, and blacklisting.

Anomaly detection is based on the principle that good browsers (such as Chrome, Firefox, Safari, and the like) have a few valid combinations of TLS fingerprints for each browser version. The "known" or "correct" combinations are learned a-priori. This can be done by analyzing prior human traffic and building a table of valid combinations (user agent and associated TLS fingerprint possibilities). A bot script masquerading its user-agent as one of the well-known browsers is then caught by checking for the existence of the user-agent and the TLS fingerprint in the "known/ correct" table.

Dynamic rate limiting is based on the principle that the system keeps tracks of the received TLS fingerprints and then rate limits TLS fingerprints. Bot Attacks can be blocked in this way, as the TLS fingerprint will rapidly exceed the allowed rate threshold.

Blacklisting is based on the principle that the TLS fingerprints of malicious bot tools can be collected and stored in a database/file (also known as a blacklist file). When a TLS fingerprint is part of this blacklist file, it is then blocked.

All of the above techniques can be modulated with other signals to produce higher accuracy.

Summarizing, the browser validation process collects information from the client using JavaScript techniques to help identify the type of client machine the edge server is interacting with and the configuration of the browser. This technique is often times referred as "fingerprinting." The process does not collect any information that could identify the user of the machine. The data collected (also known as the fingerprint) preferably is sent to a data collection platform and kept for a given time period. Preferably, the fingerprint is used to enable the provider to research and define new heuristics that help the bot detection engine to detect more advanced bots. These heuristics are preferably instantiated as detection rules and become part of a fingerprint evaluation ruleset. Preferably, the fingerprint process is only executed once a session. By analyzing the fingerprint and combining multiple parameters of the fingerprints together, it is possible to uniquely identify the client and to identify which site protected with the browser validation technology a given client visited. As additional related fingerprint information is collected and analyzed, the fingerprint evaluation ruleset may evolve, allowing the system to detect more bots. Preferably, clients that are identified as bots are tracked through their session cookie. The session cookie is unique to a given web site and cannot be used to correlate the activity of a given bot on other web sites, although the system may provide for the ability to track the activity of a botnet across customers that use the bot detection service. Activity coming from these bots preferably is tracked and reported. Logs of this activity are then to generate bot activity and bot analysis reports that can be reviewed by a customer through a secure portal.

Without intending to be limiting, the following provides additional details about the data collection process. Preferably, the JS injection technique collects client characteristics by querying DOM window objects, and also collects client characteristics by detecting browser automation. To enhance security, preferably the JS code is obfuscated, and there may be several versions of the obfuscated object to make the code appear to be different each time. The version of the JS served is recorded in the cookie to validate that a client follows a predefined workflow. Data collected by the JS is sent to the server as a URL-encoded form POST. The edge server extracts the relevant parameters and evaluates the values in-line to detect the bot. If a bot is detected, the session is flagged, and the full fingerprint is forwarded to other systems for further evaluation, typically off-line. Preferably, the JS executes a challenge that is self-contained in a single object. The code may be minified. Preferably, when injecting the JS, the transformed object is not cached at the edge. Cache busting headers may be sent to the client to prevent the transformed object to be cached by the browser or an intermediate proxy, and to further prevent false positives. The JS challenge object may be cached at the edge for a given time period.

In one operation, a client makes a request for a HTML page on a site protected with the bot detection service. In this example scenario, assume that primary bot detection rules did not trigger but that the client supports cookies. When receiving the request, the edge server validates a bot detection session cookie and fetches the content from the origin if not found in cache. If the user-agent indicates that the client supports JavaScript, the edge server injects the JavaScript code to the HTML page. To this end, a JavaScript is injected at the end of the document header, and the URL referencing the script may be in the following format "/akam/$version_number/$challenge_ID", where $version_number is a decimal value and $challenge_ID is computed with the formula "HEX(VAR XOR FILE_ID)". The edge server randomly selects a number between 1 and 1,000 that represents the challenge file ID (FILE_ID). It also randomly selects a 32-bit global variable (VAR) that is used to obfuscate the file ID as well as other variables in the fingerprint. The edge computes the challenge_ID, e.g., by doing a given logical operation between VAR and FILE_ID, and then converting the resulting value to Hexadecimal. A <noscript> statement may be added at the end of the document body to handle users that disable JavaScript on their browsers. Before serving the response, the edge server preferably updates the bot detection session cookie to indicate the browser validation process was initiated. The client receives the response and updates its cookie store. It parses the HTML code, and requests the different embedded objects (images, CSS, JS fonts). One of these objects will be the JavaScript challenge. Basic bots that are configured to only request specific types of content or do not JavaScript will not request the embedded objects. When receiving the request for the JS challenge, the edge server validate the bot detection session cookie and fetches the challenge object from a data store when not found in cache. The response from the data store may include a unique identifier (UUID) that helps identify the challenge when receiving the fingerprint, and it helps prevent replay attacks. Before serving the response, the edge server updates the Bot detection session cookie with the UUID. If the client supports JavaScript, it executes the script, collects all relevant parameters (fingerprint). The fingerprint is sent to the edge as a POST request, preferably on a "fingerprint callback" URL. The challenge ID set during the injection phase is reflected in the callback URL.

When receiving the fingerprint, the edge server validates the bot detection session cookie and performs the following: (a) validates the challenge ID, (b) authenticates, the fingerprint by validating the UUID, (c) extracts the relevant parameters for in-line bot detection, (d) evaluates the different parameters against the ruleset, (e) if the fingerprint data was received and passed the validation, the server updates the evaluation state in the session cookie to "Complete" when serving the response, (f) if the fingerprint data was not received (the client responded to the <noscript> statement), the server updates the evaluation state in the session cookie to "Incomplete" when serving the response, (g) if some anomalies were found in the fingerprint and revealed an automated system, the state is set to "bot" to flag the client so that the appropriate action is taken in the subsequent requests; and (h) once the response has been sent to the client, the edge passes to a learning system the fingerprint, the client ID computed at the edge, the header signature, and all other relevant information deemed useful.

The client updates its cookie store. After a while, the client sends a request for another page view. At this point the client will have gone through the validation process and the session cookie should be present in the request. The edge server validates the cookie, and checks the state of the validation process. If the client has successfully passed the fingerprinting process, it allows the request. If the client has completed the fingerprinting but was flagged as a bot, the edge takes the action associated with a bot detection rule. If the client did not complete the fingerprinting process, the edge server takes the action associated with an evaluation rule.

Preferably, the challenge served has a limited TTL of a few seconds (that is configurable). This timer defines how long the challenge is valid for and how long the client has to complete the validation process. This timer is designed to help reduce the following risks: detect bots that never request the JS or send a fingerprint, and replay attacks on the fingerprint. Preferably, the mechanism includes a retry process to give the client a second chance to complete the validation process and prevent false positive in the following scenarios: when the user navigates away from the page before the fingerprint process completed, the site automatically redirects or reloads a different page, e.g., based on some geolocation, and the JS process is initiated within an iframe.

Other Enabling Technologies

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines. The functionality may be provided as a service, e.g., as a SaaS solution.

The techniques herein may be implemented in a computing platform, such as variously depicted and described above, although other implementations may be utilized as well. One or more functions of the computing platform may be implemented conveniently in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof. More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

Each above-described process, module or sub-module preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

There is no limitation on the type of computing entity that may implement the client-side or server-side of the connection. Any computing entity (system, machine, device, program, process, utility, or the like) may act as the client or the server. While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

One preferred implementation of the TLS fingerprint based bot detector is in a managed service such as a content delivery network (CDN) or, more generally, an "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

The techniques herein may leverage machine learning (ML) to iteratively learn from data. As is well-known, machine learning tasks are typically classified into several categories depending on the nature of the learning signal or feedback available to a learning system: supervised learning, unsupervised learning, and reinforcement learning. In supervised learning, the algorithm trains on labeled historic data and learns general rules that map input to output/target. In particular, the discovery of relationships between the input variables and the label/target variable in supervised learning is done with a training set. The computer/machine learns from the training data. Supervised learning algorithms are Support Vector Machines, Linear Regression, Logistic Regression, Naive Bayes, and Neural Networks. In unsupervised machine learning, the algorithm trains on unlabeled data. In reinforcement learning, the algorithm learns through a feedback system. In one embodiment, the bot detection engine uses supervised machine learning to evolve the ruleset based on the TLS data detection previously described.

We claim:

1. A computer program product in a non-transitory computer readable medium, the computer program product comprising program code executable in and across a set of hardware processors, the program code comprising:
    first program code executable in a first hardware processor and configured to execute a script and, responsive to execution of the script, to output a set of transport layer security parameters;
    second program code executable in a second hardware processor and configured to receive and extract the set of transport layer security parameters, to process the extracted set of transport layer security parameters into a hash value, and to selectively output the hash value; and
    third program code executable in a third hardware processor and configured to receive the hash value, based on a machine learning model, carry out a determination whether an entity that generated the set of transport layer security parameters as reflected by the hash value has a characteristic associated with a bot, and to provide the second program code an indication based on the determination;
    wherein the second program code is further configured to receive and to take a given action based on the indication.

2. The computer program product as described in claim 1 wherein the set of transport layer security parameters are associated with a Transport Layer Security (TLS) connection initiated by a client entity associated with the first hardware processor.

3. The computer program product as described in claim 2 wherein the TLS connection is initiated by the client entity by a client hello message.

4. The computer program product as described in claim 3 wherein the set of transport layer security parameters comprise information derived from the client hello message, the information being at least one of: a record layer version, a client version, a set of ordered TLS extensions, an ordered cipher list, an ordered elliptic curve list, and an ordered signature algorithms list.

5. The computer program product as described in claim 1 wherein the third program code is further configured to persist the hash value for a duration of a session associated with a client request.

6. The computer program product as described in claim 1 wherein the given action is one of: denying a client request, tarpit the client request, serving alternative content in response to the client request, passing the client request forward to an origin, and serving a response to the client request.

7. The computer program product as described in claim 1 wherein the second program code is further configured to check the hash value against a data set of known bad hash values.

8. The computer program product as described in claim 7 wherein the third program code is further configured to generate the data set of known bad hash values, and to provide the data set of known bad hash values to a server entity associated with the second hardware processor.

9. The computer program product as described in claim 1 wherein the third program code is further configured to generate the machine learning model using supervised learning.

10. The computer program product as described in claim 1 wherein the first hardware processor is associated with a client entity, the second hardware processor is associated with a server entity, and the third hardware processor is associated with a bot detection service entity.

11. The computer program product as described in claim 10 wherein the server entity is one of a set of server entities of a content delivery network (CDN).

12. The computer program product as described in claim 10 wherein the second progam code of the server entity is further configured to deliver the script to the client entity.

13. The computer program product as described in claim 1 wherein the first hardware processor is located remote from the second hardware processor.

14. The computer program product as described in claim 1 wherein the second hardware processor is located remote from the third hardware processor.

15. The computer program product as described in claim 1 wherein the set of transport layer security parameters comprise a fingerprint.

* * * * *